United States Patent [19]
Kawaguchi et al.

[11] Patent Number: 5,964,329
[45] Date of Patent: Oct. 12, 1999

[54] TORQUE CONVERTER HAVING A LOCKUP CLUTCH

[75] Inventors: Toru Kawaguchi, Ashiya; Takao Fukunaga, Yawata, both of Japan

[73] Assignee: Exedy Corporation, Osaka, Japan

[21] Appl. No.: 08/863,183

[22] Filed: May 27, 1997

[30] Foreign Application Priority Data

May 29, 1996 [JP] Japan .................................. 8-135518

[51] Int. Cl.$^6$ ............................................... F16H 45/02
[52] U.S. Cl. ....................................... 192/3.3; 192/113.36
[58] Field of Search ................................. 192/3.29, 3.3, 192/113.34, 113.35, 113.36, 55.61, 212

[56] References Cited

U.S. PATENT DOCUMENTS

| | | |
|---|---|---|
| 2,707,887 | 5/1955 | Slack . |
| 2,943,516 | 7/1960 | Herndon ............................ 192/3.3 X |
| 3,068,974 | 12/1962 | Jandasek ........................... 192/3.3 X |
| 3,240,308 | 3/1966 | Frost ................................. 192/3.3 X |
| 3,313,181 | 4/1967 | Leonard et al. .................... 192/3.3 X |
| 4,108,289 | 8/1978 | Arai et al. ............................. 192/3.3 |
| 4,529,070 | 7/1985 | Kobayashi ......................... 192/3.3 X |
| 4,949,822 | 8/1990 | Martin ................................... 192/3.3 |
| 4,951,788 | 8/1990 | Martin . |
| 5,054,590 | 10/1991 | Paulsen ............................ 192/3.29 X |
| 5,211,270 | 5/1993 | Tamura et al. ....................... 192/3.29 |
| 5,400,884 | 3/1995 | Matsuoka .......................... 192/3.3 X |
| 5,441,135 | 8/1995 | Worner et al. . |
| 5,511,640 | 4/1996 | Fukunaga .......................... 192/3.3 X |
| 5,533,602 | 7/1996 | Worner et al. . |
| 5,570,767 | 11/1996 | Lauscher ...................... 192/113.34 X |
| 5,755,314 | 5/1998 | Kanda et al. ................. 192/113.35 X |

FOREIGN PATENT DOCUMENTS

| | | |
|---|---|---|
| 21 41 259 | 8/1971 | Germany . |
| 35 43 013 | 6/1987 | Germany . |
| 43 16 289 | 11/1993 | Germany . |
| 43 42 439 | 6/1994 | Germany . |
| 4420959 | 1/1995 | Germany . |
| 43 44 562 | 4/1995 | Germany . |
| 2092710 | 8/1982 | United Kingdom . |

Primary Examiner—Rodney H. Bonck
Attorney, Agent, or Firm—Shinjyu An Intellectual Property Firm

[57] ABSTRACT

A lockup mechanism (9) in a torque converter (1) includes a clutch portion (23) capable of selective engagement and disengagement between a front cover (3) and a turbine (5), and a piston member (21) which forms a sealed oil chamber (B) together with the front cover (3) and selectively engages and disengages the clutch portion (23) in accordance with the change in the oil pressure within the oil chamber (B).

49 Claims, 5 Drawing Sheets

TORQUE CONVERTER HAVING A LOCKUP CLUTCH

BACKGROUND OF THE INVENTION

A. Field of the Invention

The present invention relates to a torque converter, and in particular to a torque converter having a lockup clutch.

B. Description of the Background Art

Generally, a torque converter provides an automotive vehicle with a smooth acceleration and deceleration since torque transmission is carried out via movement of a working fluid or oil. However, energy loss is experienced due to the general nature and physical characteristics of the working fluid, so that fuel efficiency of an automotive vehicle with a torque converter is not necessarily optimal.

Some conventional torque converters employ lockup mechanisms for mechanically connecting a front cover of the torque converter to the turbine or output of the torque converter. The lockup mechanism is disposed within a space defined between the turbine and the front cover. Typically, the lockup mechanism includes a disc-shaped piston member which can be urged into contact into with the front cover and a drive plate attached to a backside or other portion of the turbine. Usually coil springs are incorporated into the lockup clutch mechanism for elastically coupling the piston member and the driven plate in the circumferential direction to absorb vibrations and allow limited relative rotary displacement between the driven plate and the piston member. An annular friction element is formed on one portion of the piston member at a position opposed a corresponding planar friction surface of the front cover.

In the conventional lockup clutch described above, the working operation of the piston member is controlled by manipulation of the flow of working oil in the torque converter. Specifically, the direction of the flow of the working oil within the torque convertor determines whether the piston member and the front cover are engaged with one another or not. With the lockup mechanism in the engaged state, working oil in the space between the piston member and the front cover may be drained from a radial inner portion of the torque convertor and the piston is pressed into contact with the front cover. As a result, torque is directly transmitted from the front cover to the turbine via the piston member and the coil spring.

In the conventional lockup mechanism, as described above, the piston member is controlled by working oil flowing inside the torque converter. Therefore, the engagement and disengagement operations cannot always be precisely carried out due to the turbulent flow of the working oil within the torque convertor. Moreover, when the lockup clutch engagement and disengagement operations are carried out, the response time is generally slow. Specifically, the amount of time that passes beginning with the instant lockup clutch engagement is determined necessary until the lockup clutch actually engages is considerable. Further, in the conventional lockup mechanism, working oil cannot flow the portion between the friction surface of the front cover and the wet friction facing on the piston member, so that the wet friction facing might not be sufficiently cooled by adjacent flow of fluid, thereby shortening the service life of the wet friction facing.

Conventionally, sufficient amounts of torque are not always transmitted in the lockup mechanism when a single friction surface is used. Therefore, a multiple disc lockup clutch having a plurality of friction surfaces formed on a plurality of friction plates is often used in torque convertors. In such a multiple disc lockup clutch, however, each friction plate must be displaced in order for the lockup clutch to move from the engaged state to the disengaged state, in order to reduce drag forces that are often generated.

SUMMARY OF THE INVENTION

One object of the invention is to effect a sure operation of a lockup mechanism in a torque converter.

Another object of the invention is to prolong the service life of a frictional connecting portion of a lockup mechanism in a torque converter by sufficiently cooling friction surfaces therein.

Still another object of the invention is to suppress the occurrence of drag torque while holding a sufficient torque transmission capacity of a lockup mechanism in a torque converter.

In accordance with the one aspect of the present invention a torque converter having a lockup mechanism includes a front cover and an impeller shell attached to the front cover defining a working oil chamber. Within the working oil chamber, there is an impeller fixed to the impeller shell, a turbine disposed within the working oil chamber opposed to the impeller, and a stator disposed between the radial inner portion of the impeller and the radial inner portion of the turbine. A lockup mechanism is also disposed within the working oil chamber and is configured for selective engagement and disengagement of the front cover with the turbine. The lockup mechanism has a piston member disposed adjacent to the front cover, the piston member and the front cover defining a sealed pressure chamber which is sealed against fluid flow between the sealed pressure chamber and a remaining portion of the working oil chamber, the piston member selectively movable to and from an engaged position and a disengaged position in response to changes in oil pressure within the sealed pressure chamber.

Preferably, the piston member is formed from a disc-shaped plate of deformed sheet metal.

Preferably, the piston member is engaged with the front cover for rotation therewith and configured for limited axial movement with respect to the front cover.

Preferably, there is a first seal member disposed on a radial mid-portion of the piston member and in contact with a portion of the front cover, a second seal member in contact with a radial inner portion of the piston member for providing a seal between the pressure chamber and the remaining portion of the working oil chamber.

Preferably, a portion of the front cover includes a cylindrical wall, and the first annular seal contacts a radial inner surface of the cylindrical wall.

Preferably, the lockup mechanism includes a clutch portion and the cylindrical wall is formed radially inward from a radially inner periphery of the clutch portion.

Preferably, a center boss is fixed to the front cover, the center boss including a first cylindrical portion which extends toward the impeller and the turbine. Further, the second seal member is disposed in an annular groove formed in the first cylindrical portion.

Preferably, the turbine comprises a turbine hub having a second cylindrical portion extending axially along a radial inner side of the first cylindrical portion.

Preferably, the first cylindrical portion is formed with a first port open to the pressure chamber.

Preferably, there is a second port which is disposed between the center boss and the turbine hub, the second port being open to the remaining portion of the working oil chamber.

Preferably, there is a third annular seal disposed in the second cylindrical portion of the turbine hub between the first and second ports providing a seal therebetween.

Preferably, the second port and the piston member are configured to allow circulation of a working oil through the clutch portion.

Preferably, the remaining portion of the working oil chamber includes a first space defined between the piston member and a portion of the turbine, the second port being configured to allow flow of the working oil into the first space, portions of the piston member being formed with holes positioned to allow generally continuous flow of the working oil into the clutch portion regardless of the position the piston member.

Preferably, the second port is a sole inlet for the working oil flowing into the remaining portion of the working oil chamber.

Preferably, the portions of the piston member which are formed with the holes include a generally radial mid-portion thereof formed with a set of first discharge holes adjacent to the first annular seal.

Preferably, the clutch portion includes at least one driven plate having a friction surface formed with a plurality of grooves, the grooves configured to allow the working oil to flow from a radial inner side of the driven plate to a radial outer side thereof.

Preferably, the clutch portion includes a first drum fixed to the front cover, a second drum which is concentrically disposed radial inwardly from the first drum and coupled to the turbine, and the driven plate disposed between the first drum and the second drum, the driven plate configured to rotate with the second drum.

Preferably, the second drum is formed with a radially penetrating hole which allows the working oil to flow from the first space to a radial outer side of the second drum.

Preferably, the front cover includes a second cylindrical wall extending toward the turbine, and the first drum is fitted within an inner periphery of the second cylindrical wall.

Preferably, the first drum includes an annular disc portion fixed to the front cover radially inward from the second cylindrical wall.

Preferably, the first drum includes a plurality of first teeth protruding radially inwardly, the second drum comprises a plurality of second teeth protruding radially outwardly, and the driven plate includes on a radial inner portion thereof a plurality of third teeth engaging with the plurality of the second teeth.

Preferably, the first drum is formed with a tapering outer diameter, the tapering outer diameter increasing from adjacent to the front cover toward the turbine such that centrifugal force moves the working oil in the direction of the increase of the tapering outer diameter.

Preferably, the clutch portion includes a drive plate disposed adjacent to the driven plate, the drive plate formed with a set of fourth teeth engaged with the first teeth on the first drum, and a portion of the drive plate and the first drum define a plurality of gaps between portions thereof which allow for the flow of the working oil.

Preferably, the piston member is formed at a radially outer edge with fifth teeth which engage the first teeth of the first drum.

Preferably, the piston member includes a pressing portion configured to contact the driven plate of the clutch portion.

Preferably, a backup plate is mounted in the first drum and restrained against axial movement within the first drum, the driven plate includes a first and a second driven plates where the drive plate is axially disposed between the first and second driven plates and the first and second driven plates are disposed between the backup plate and the pressing portion of the piston member.

Preferably, the backup plate is formed on a radial inner portion thereof with a protruding portion which limits flow of the working oil around the radially inner portion of the backup plate portion.

Preferably, the radially penetrating holes of the second drum are open to a space defined between radial inner portions of the first and second driven plates.

Preferably, there is a snap ring confined in the first drum adjacent to the backup plate limiting axial movement of the backup plate.

Preferably, the second drum is fixed to the turbine.

Alternatively, a damper mechanism elastically connecting the second drum to the turbine.

Preferably, the damper mechanism includes at least one pair of coil springs.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
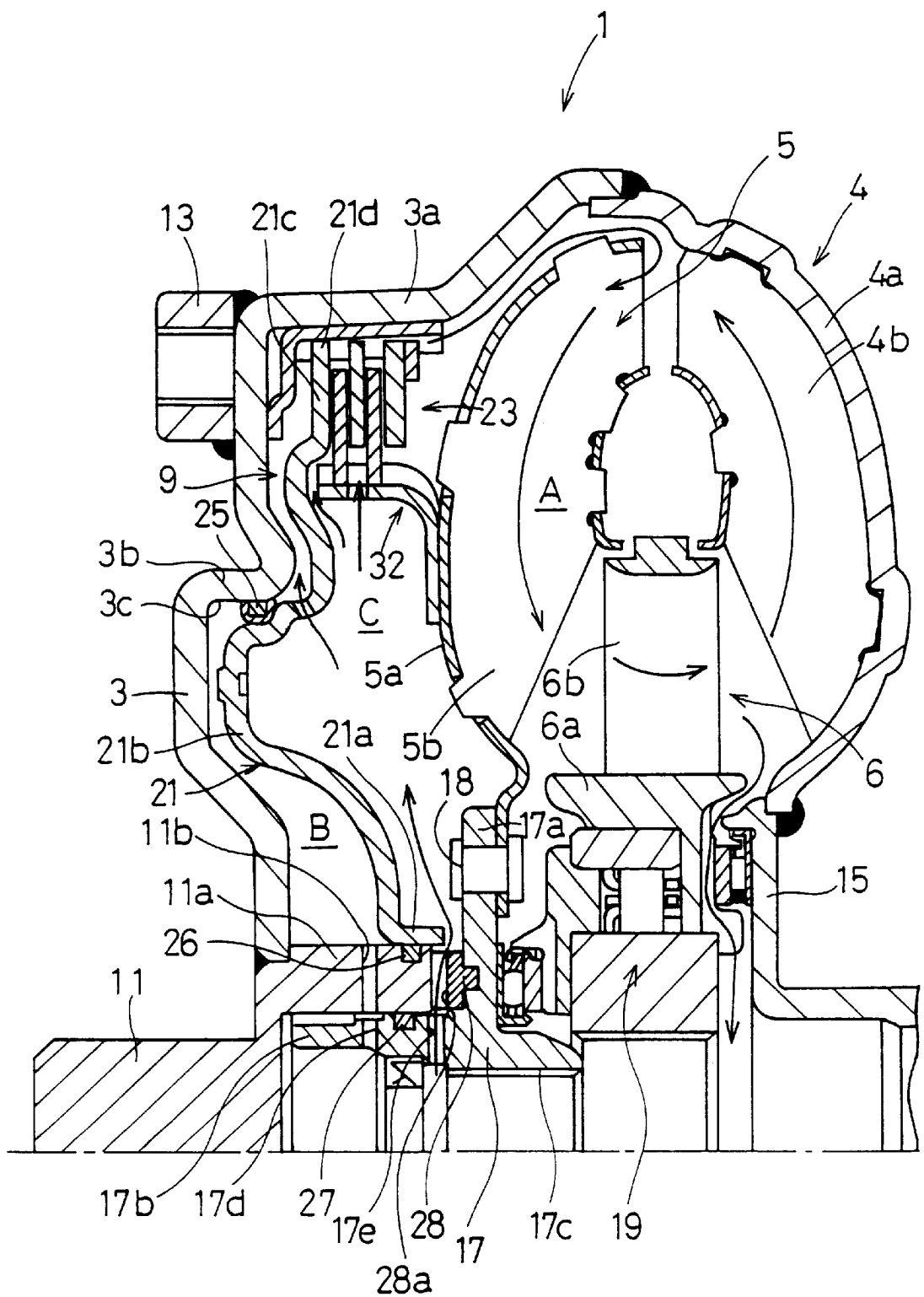
FIG. 1 is a schematic cross sectional side view of a torque converter having a lockup mechanism in accordance with a first embodiment of the present invention.

FIG. 1 shows a torque converter 1 in accordance with a first embodiment of the present invention. The torque converter 1 includes a front cover 3 and three kinds of runners (an impeller 4, a turbine 5 and a stator 6) which are concentrically disposed with respect to the front cover 3. A lockup mechanism 9 is disposed between the front cover 3 and the turbine 5 in the axial direction. The front cover 3 and an impeller shell 4a of the impeller 4 are welded together at corresponding radial outer portions and together define a working oil chamber which includes a space A, a pressure chamber B and a space C. The front cover 3 and the impeller shell 4a are both made of sheet metal, thus the whole weight and size of the torque converter 1 are minimized. Hereinafter two direction oriented expressions will be used, as engine side and a transmission side. The left side of FIGS. 1 and 2 will be referred to as the engine side and the right side of FIGS. 1 and 2 will be referred to as the transmission side since the torque converter 1 is connected to either a crankshaft or a flex plate which is powered by an engine disposed to the left of FIG. 1 and the torque convertor 1 transmits torque to a transmission disposed to the right side of FIG. 1.

The front cover 3 is connected to an input element such as a flex plate or the crankshaft of the engine (not shown) disposed on the engine side. A center boss 11 (described below) is fixed to the central portion of the front cover 3. A plurality of nuts 13 are welded to a surface on the engine side of the outer peripheral portion of the front cover 3 for fixing the torque convertor 1 to, for instance, the flex plate (not shown). The outer peripheral portion of the front cover 3 is formed with a cylindrical portion 3a which extends to the transmission side. The end of the cylindrical portion 3a is welded to the impeller shell 4a. A radial intermediate cylindrical portion 3b made by drawing or deformation process is provided on the radial outer portion of the front cover 3 (or a portion adjacent to the inner circumference of the clutch portion 23).

Working oil is circulating from the impeller 4 to the turbine 5 and further to the stator 6 (in the order given) in the space A defined within the torque converter main unit.

The impeller 4 is composed of the impeller shell 4a and a plurality of impeller blades 4b fixed on the inner side of the impeller shell 4a. An impeller hub 15 is fixed to a radial inner portion of the impeller shell 4a.

The turbine 5 is positioned so as to be opposed to the impeller 4 within working oil chamber. The turbine 5 is composed of a turbine shell 5a and a plurality of turbine blades 5b fixed to the turbine shell 5a. The radial inner portion of the turbine shell 5a is fixed to a flange 17a of a turbine hub 17 by a plurality of rivets 18. The turbine hub 17 includes a second cylindrical portion 17b extending to the engine side. Further, the central portion of the turbine hub 17 is formed with a spline hole 17c which is engaged with a main drive shaft (not shown) extending from the transmission side.

The engagement portion between the center boss 11 and the turbine hub 17 will now be described. The center boss 11 includes a first cylindrical portion 11a further radially extending from the radial inner end of the front cover 3 to the transmission side. The end of the first cylindrical portion 11a is adjacent to the radial inner portion of the flange 17a of the turbine hub 17. A washer 28 is disposed between the first cylindrical portion 11a and the turbine hub 17 in the axial direction. A plurality of radially extending port grooves 28 are formed in the washer 28 adjacent to the center boss 11. A plurality of radially extending first port holes 11b are formed in the first cylindrical portion 11a. The second cylindrical portion 17b is fitted within the inner portion of the of the first cylindrical portion 11a. A plurality of second port holes 17d which radially penetrate are formed in the second cylindrical portion 17b at the positions axially corresponding to the first port holes 11b of the first cylindrical portion 11a. Further, a plurality of third port holes 17e which radially penetrate are formed in the second cylindrical portion 17b at the positions axially corresponding to the port grooves 28a of the washer 28. A third annular seal 27 is disposed in the radial outer surface of the second cylindrical portion 17b between the second port hole 17d and the third port hole 17e in the axial direction. The third annular seal 27 disposed in the recess formed in the second cylindrical portion 17b is in contact with the first cylindrical portion 11a to seal between the second port hole 17d and the third port hole 17e. First and second annular seals 25 and 26 are described below.

The second port holes 17d and the second port holes 17e communicate with separate oil paths disposed in a transmission main drive shaft (not shown). Each oil path communicates with an oil pressure control circuit (not shown) which is, for instance, part of the transmission (not shown) fluid circuit system.

The stator 6 is composed of a stator carrier 6a and a plurality of stator blades 6b fixed to the radial outer surface of the stator carrier 6a. The stator carrier 6a is supported on the fixing shaft (not shown) via a one way clutch 19.

The lockup mechanism 9 includes a piston member 21 and the clutch portion 23. The piston member 21 is a sheet metal member having a disc-like shape and is disposed adjacent to the front cover 3. Since the piston member 21 is a sheet metal member, it is easily worked or manufactured and manufacturing costs are reduced. The radial inner end of the piston member 21 is formed with a radial inner cylindrical portion 21a extending toward the transmission side. The radial inner cylindrical portion 21a is in contact with the radial outer surface of the first cylindrical portion 11a of the center boss 11. The radial inner cylindrical portion 21a is also in contact with the second annular seal 26 provided in the radial outer surface of the first cylindrical portion 11a. The radial intermediate portion of the piston member 21 is made an extending portion 21b that extends toward the engine side. The rigidity of the piston member 21 is increased compared to prior art configurations due to the inclusion of the extending portion 21b. Further, a first annular seal 25 is fixed to the radial outer portion of the extending portion 21b. The first annular seal 25 is configured to contact and slide on a radial inner surface 3c of the cylindrical portion 3b of the front cover 3. With this arrangement, the pressure chamber B is defined between the front cover 3 and the piston member 21. In other words, the radial outer portion of the pressure chamber B is sealed by the first annular seal 25, and the radial inner portion of the pressure chamber B is sealed with the second annular seal 26. Both seal 25 and 26 allow the piston member 21 to slide in the axial directions with respect to the corresponding components of the torque convertor 1 but not to rotate with respect thereto.

As described above, the pressure chamber B is sealed and therefore fluid pressure of the working oil within the pressure chamber B may be controlled to more accurately control the movement of the piston member 21, as is described below. Further, when the clutch lockup mechanism is in disengaged state, the piston member 21 is in a position that is spaced apart from a backup plate 36 (to be discussed below). The movement of the piston member 21 toward the engine side, away from the backup plate 36 allows for space between friction surfaces (discussed below). As a result, the drag torque generated when the lockup mechanism is in the released state is reduced.

Figure 2:
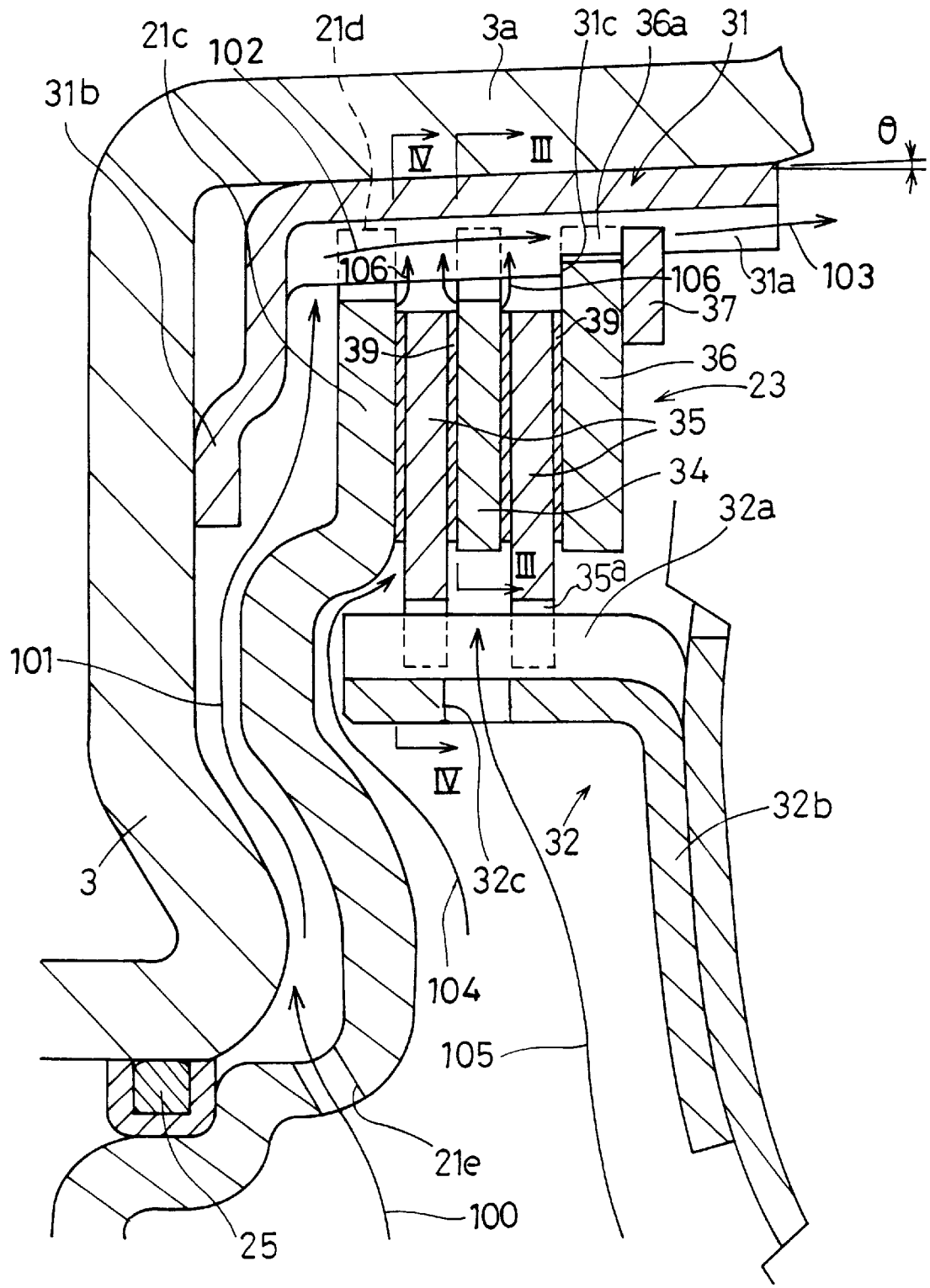
FIG. 2 is a fragmentary cross sectional view of the torque converter depicted in FIG. 1, on a slightly enlarged scale, showing details of a clutch portion of the lockup mechanism.

As is shown in FIG. 2, an radial outer radial portion of the piston member 21 defines a planar pressing portion 21c. The radial outer edge of the piston member 21 is formed with a plurality of radial outer teeth 21d. The radial outer teeth 21d are engaged with a portion of the clutch portion 23 described below.

A plurality of discharge holes 21e are formed in the piston member 21 adjacent to, but radially outward from the first annular seal 25.

The clutch portion 23, as shown in FIG. 2, includes a first drum 31, a second drum 32, a drive plate 34 and two driven plates 35. The first drum 31 is a cylindrical member of sheet metal and is formed with a plurality of axially extending inner teeth 31a on its cylindrical portion. The cylindrical portion of the first drum 31 is forced into the radial outer cylindrical portion 3a of the front cover 3. The cylindrical portion of the first drum 31 is supported on the inner surfaces of the cylindrical portion 3a. The cylindrical portion of the first drum 31 is made with a slightly tapered diameter which increases as the first drum 31 extends from engine side to the transmission side. Preferably, the tapered angle θ is within the range from a degree of 2 to 3. The first drum 31 includes a disc plate fixing portion 31b extending radially inwardly on the engine side of the first drum 31. The disc plate fixing portion 31b is fixed to the front cover 3 by spot welding, thereby enhancing the fixing strength of the first drum 31 to the front cover 3.

Radial outer teeth 21d of the piston member 21 are engaged with the inner teeth 31a of the first drum 31 so as not to rotate relative to them but to be movable to them in axial directions.

The second drum 32 is concentrically disposed on the inner circumferential side of the first drum 31. The second drum 32 is also a cylindrical member of a sheet metal. The cylindrical portion of the second drum 32 includes a plurality of outer teeth 32a. The axially intermediate portion of the second drum 32 is formed with a plurality of radially penetrating holes 32c. A disc plate fixing portion 32b which extends radially inwardly is formed on the transmission side of the second drum 32. The disc plate fixing portion 32b is fixed to the turbine shell 5a by, for example, welding. Since the second drum 32 is fixed to the turbine shell 5a, the structure is simplified and the size is reduced.

A backup plate 36 is fixed to the first drum 31 so as to axially oppose to the pressing portion 21c of the piston member 21. The radial outer portion of the backup plate 36 is formed with interlocking teeth 36a which are engaged with the inner teeth 31a of the first drum 31 so as not rotatable relative to them. The portion on the engine side of the inner teeth 31a of the first drum 31 is radially shortly cut away to form a stepped portion 31c. The radial outer portion of the backup plate 36 is in contact with the stepped portion 31c from the transmission side. In other words, the backup plate 36 is configured not to be movable toward the engine or the pressing portion 21c of the piston member 21. Consequently, drag torque hardly generates with the lockup clutch in a disengaged state. This allows a multiple disc clutch having a plurality of friction surfaces to be employed which minimizes drag due to contact between disengaged friction surfaces. As a result, the lockup mechanism 9 holds the sufficient torque transmitting capacity. A snap ring 37 is fixed on the transmission side surface of the backup plate 36 in the first drum 31. With this configuration, the backup plate 36 is not movable toward the transmission.

Figure 3:
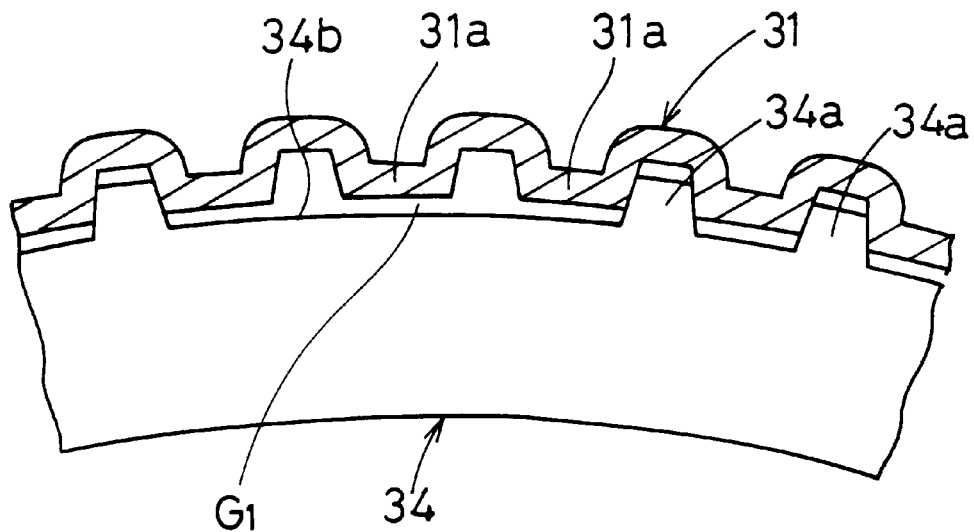
FIG. 3 is a cross sectional view showing engagement between a drive plate and other portions of the lockup mechanism depicted in FIGS. 1 and 2, taken along the line III—III in FIG. 2.
Figure 4:
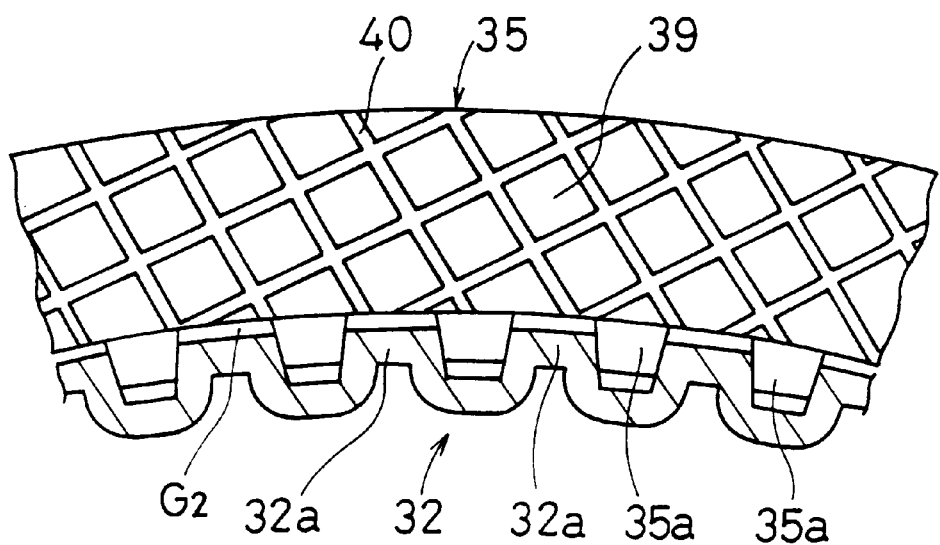
FIG. 4 is a cross sectional view showing the engagement of a driven plate other portions of the lockup mechanism depicted in FIGS. 1 and 2, taken along the line IV—IV in FIG. 2.

Two driven plates 35 are disposed between the pressing portion 21c and the backup plate 36. A drive plate 34 is disposed between the driven plates 35. Each of the driven plates 35 includes interlocking teeth 35a on its radial inner side. The interlocking teeth 35a are engaged with outer teeth 32a of the second drum 32. Wet friction facings 39 are adhered to both sides of the driven plates 35. Each surface of the wet friction facing 39 is formed with radially communicating grooves 40, as shown in FIG. 4. The radial outer portion of the drive plate 34 is formed with interlocking teeth 34a which are engaged with inner teeth 31a of the first drum 31. As shown in FIG. 3, non-tooth portions 34b omitting teeth are formed on the radial outer portion of the drive plate 34 at a plurality of portions. A large gap $G_1$ which extends radially is therefore defined between the non-tooth portion 34b and the first drum 31. The gap $G_1$ allows working oil to move in the radial direction and in an axial direction on the radial outer portion of the drive plate 34. A non-tooth portion may be formed on the radial outer portion of the piston member 21 or the backup plate 36 so as to correspond to the non-tooth portion 34b. The radial outer portion of the snap ring 37 may be formed with a fluid flowing portion such as a hole or a cutaway. It is easy to increase the number of the disc used in the clutch portion, since the first drum 31 and the second drum 32 form the clutch portion 23. It is also easy to alter the number of the annular friction plates to be used.

Working oil flowing from the second port groove 28a into the space C defined between the turbine 5 and the piston member 21 moves radially outwardly in response to centrifugal force and passes through the clutch portion 23. Working oil passing through the clutch portion 23 moves further radially outwardly and flows into the space A defined within the torque converter main unit from the inlet of the turbine 5. In the space A defined within the torque converter 1, working oil flows from the turbine 5 to the stator 6 and circulates further to the impeller 4. Working oil is discharged from the boundary between the stator 6 and the impeller 4, passing through the portion between a stator carrier 6a and the impeller hub 15. As apparent from description above, the port groove 28a is a sole inlet for working oil circulating inside the space A within the torque converter main unit. In other word, working oil circulating inside the space A always passes through the clutch portion 23 and assists in cooling the clutch portion 23. As a result, the service life of the clutch portion 23 is considerably prolonged. In the present invention, working oil can pass through the clutch portion 23, since the pressure chamber B for operating the piston member 21 is separately provided whereby the piston member is surely operated.

In the present invention, due to the inclusion of the various fluid passages such as port holes 17e, port grooves 28, hole 21e, hole 32c, grooves 40 and gaps G, there is continuous flow of working oil throughout and around the driven plates 35. The movement of working oil in the clutch portion 23 will now be described in detail with reference to the FIGS. 1 and 2. A portion of working oil flows from the space C, through the hole 21e, as designated by the arrow 100, and passes between the piston member 21 and the front cover 3 as indicated by the arrow 101, through the gap $G_1$ as indicated by the arrow 102, and to the space A, as indicated by the arrow 103. Another portion of the working oil passes between the engine side end of the second drum 32 and the piston member 21, as indicated by the arrow 104, and flows between the radial inner portion of the pressing portion 21c and the radial inner portion of the driven plate 35 disposed on the engine side. This working oil moves outward in the radial direction through the grooves 40 formed in the wet friction facings 39. Further, still more of the working oil passes through the hole 32c of the second drum 32, as indicated by the arrow 105, and flows into a space defined between the radial inner portions of two of the driven plates 35. The working oil then also passes through the grooves 40 formed in the wet friction facings 39 on two of the driven plates 35 and moves to the radial outer side of the driven plates 35, as indicated by the small arrows 106. Contaminates such as sludge-like substances of oxide materials produced due to wear is less likely to gather in the space defined between the piston member 21 and the front cover 3, since working oil passes through the discharge hole 21e to flow into the space C and flows further outward in the radial direction. In prior art configurations, when sludge-like substances of oxide material do collect, the seals similar to the first annular seal 25 are usually damaged and is rapidly degraded. Therefore, the present invention reduces the possibility of damage to seal due to the generally continuous flow of working fluid within the clutch portion 23 and the space C.

Working oil reaches the radial inner portion of the first drum 31 or the radial outer portion of the respective plate members 35 moves to the transmission side through the axial gap $G_1$ defined by the non-tooth portions 34b of the drive plate 34. Working oil also moves in the axial direction through a gap $G_1$. In this embodiment, the first drum 31 is made tapered, so that working oil smoothly moves to the transmission side.

When the oil pressure within the pressure chamber B is increased, the piston member 21 is moved toward the backup plate 36 (the transmission side), and the drive plate 34 and two of the driven plates 35 are engaged between the pressing portion 21c and the backup plate 36 (as shown in FIGS. 1 and 2). Consequently, torque is transmitted from the first drum 31 to the second drum 32. With the lockup in the engaged state, the snap ring 37 receive the force applied to the backup plate 36. When the oil pressure within the pressure chamber B becomes lower, the piston member 21 is moved to the engine side due to the fluid pressure in the space C. This releases the pressing force of the pressing portion 21c whereby the engagement between the drive plate 34 and the driven plates 35 are released. At this time, the operation of the piston member 21 is controlled by means of the oil pressure within the sealed pressure chamber B, so that the piston member 21 is not moved toward the backup plate 36. As a result, drag torque hardly generates with the lockup in the released state. Further disengagement of the lockup clutch mechanism and separation of the plates 34 and 35 is assisted by the flow of fluid therethrough.

As the first annular seal 25 is positioned on the radial inner portions of the piston member 21 and the front cover 3 and adjacent to the clutch portion 23, it is not necessary to provide a seal portion on the radial outer end of the piston member. Consequently, the radial outer portion of the piston member 21 can be made a planar pressing portion 21c to be directly in contact with the driven plate 35. With this manner, the number of the friction plates can be reduced when a plurality of friction plates are used.

Further, the radial outer portion of the pressure chamber B is located adjacent to the inner periphery of the clutch potion 23 between the front cover 3 and the piston member 21. This makes it possible to provide the radial outer teeth 21d on the radial outer edge of the piston member 21, thereby engaging with the member on the engine side of the front cover 3 (the first drum 31). As a result, it is not necessary to provide engaging portions on the radial inner portion of the piston member as well as the corresponding member, thereby simplifying the structure.

Second Embodiment

Figure 5:
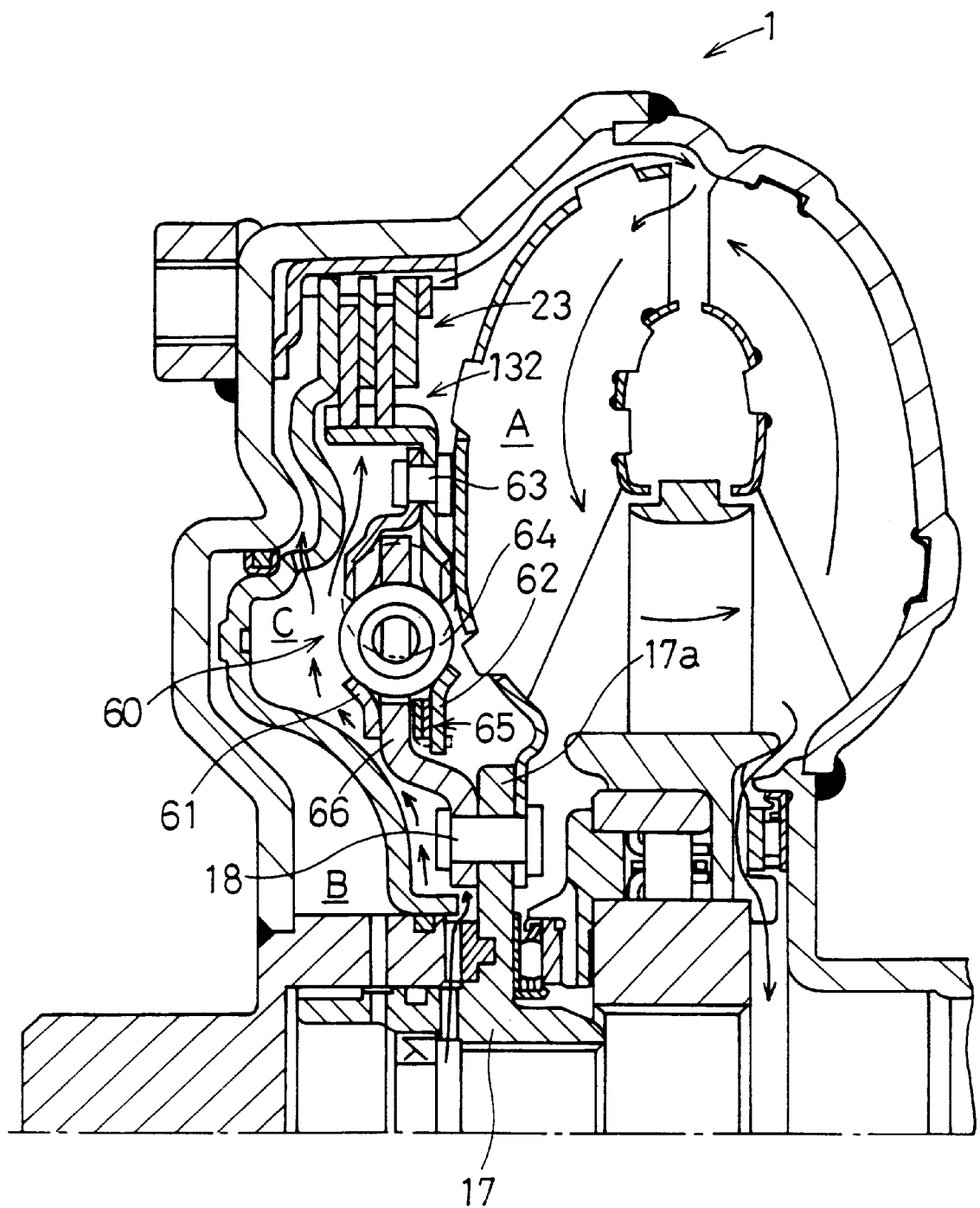
FIG. 5 is a view similar to FIG. 1, showing a torque convertor in accordance with a second embodiment of the present invention.

A second embodiment of the present invention is shown in FIG. 5. The torque converter 1 shown in FIG. 5 has many features that are similar or the same as the embodiment described above with respect to FIGS. 1–4. Therefore, only those features that differ will be described. For instance, in the second embodiment, the second drum 132 is an output member in the clutch portion 23 is connected to the flange 17a of the turbine 17 via a torsional vibration dampening mechanism 60.

The end of the cylindrical portion on the transmission side of the second drum 132 is formed with a disc plate portion 62 extending radially inward. A drive plate 61 is disposed at the position opposing to the disc plate portion 62. The outer peripheral portion of the drive plate 61 is fixed to the second drum 32 by a rivet 63. The outer peripheral portion of the driven plate 66 is disposed between the disc plate portion 62 and the drive plate 61. The inner peripheral portion of the driven plate 66 is fixed to the flange 17a of the flange 17 by a rivet 18. A plurality of coil springs 64 are disposed within windows formed in the driven plate 66. Respective coil springs 64 are retained by raised portions formed in the disc plate portion 62 and the drive plate 61. With this arrangement, the second drum 32 and the turbine hub 17 are elastically connected in the circumferential direction via the coil springs 64.

Disposed between the radial inner portion of the disc plate portion 62 and the driven plate 66 is a friction generating mechanism 65 composed of a plurality of annular plates.

The shock occurring when the clutch is engaged or the torsional vibrations are attenuated by the torsional vibration dampening mechanism 60.

Third Embodiment

Figure 6:
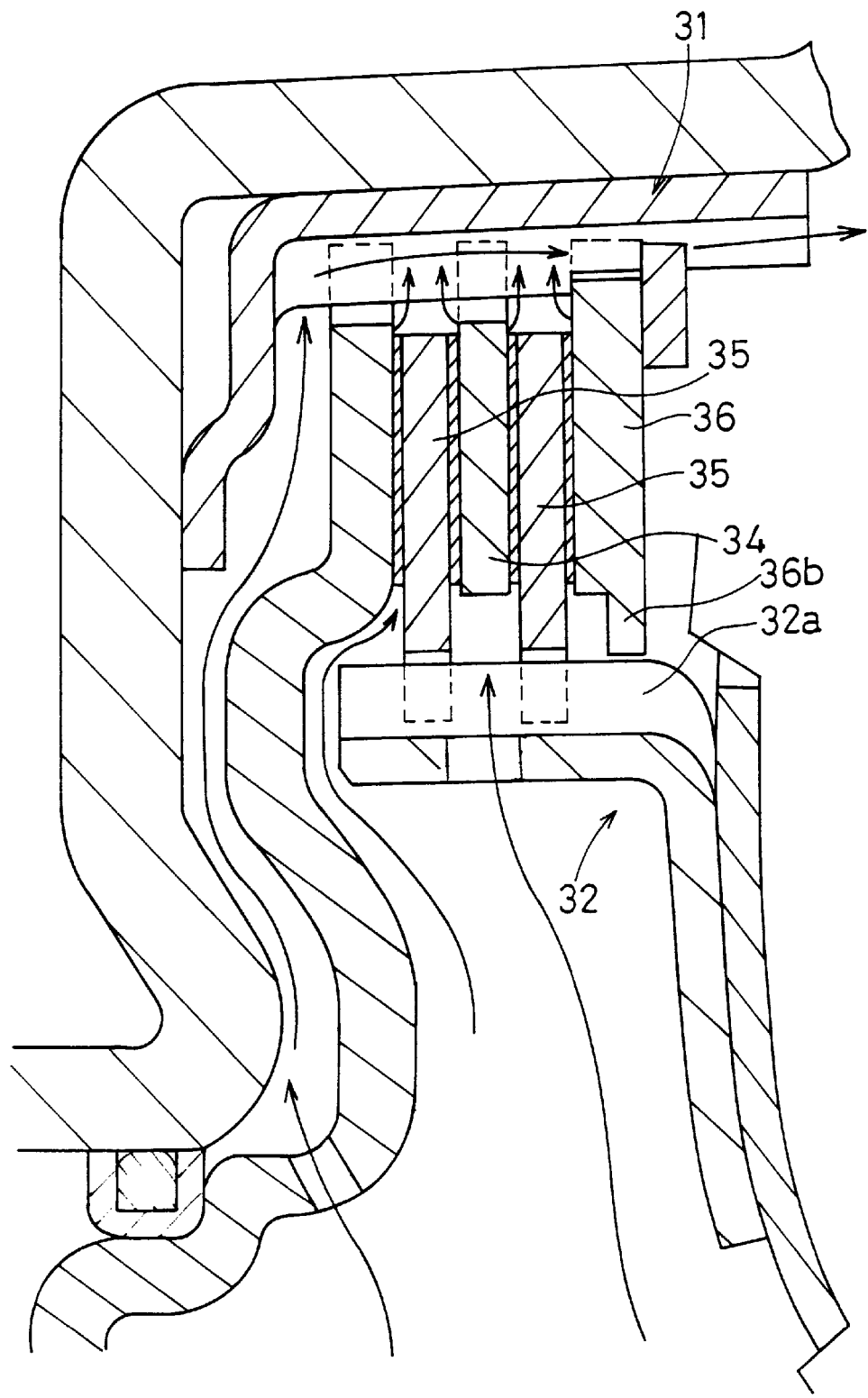
FIG. 6 is a view similar to FIG. 2, showing a torque convertor in accordance with a third embodiment of the present invention.

A third embodiment of the present invention is depicted in FIG. 6. Again, many of the features of the third embodiment are similar or the same as features described above, and therefore only those features that differ are described below. As shown in FIG. 6, a radially inwardly protruding extension 36b is provided on the radial inner portion on the transmission side of the backup plate 36. The extension 36b is adjacent to the second drum 32. When the non-tooth portion is formed in the radial inner portion of the driven plate 35 beside the backup plate 36 allow working oil to flow in the axial direction, working oil filled between the radial inner portions of two of the driven plates 35 moves to the space defined between the extension 36b of the backup plate 36 and the driven plate 35 on the transmission side. Further, the working oil moves radially outwardly, passing through the grooves 40 formed in the driven plate 35 and the backup plate 36. As a result, the friction surface between the driven plate 35 on the transmission side and the backup plate 36 can be sufficiently cooled.

MODIFICATIONS

The first drum 31 may be detachably attached to the front cover 3. The number of the friction plates to be used can be readily altered by exchanging the first drums 31.

The grooves 40 formed in the wet fiction facing 39 of the driven plate 35 are not limited to the embodiment described above. The grooves 40 may comprise a plurality of radially extending grooves. Alternatively, a plurality of segmental friction members may be fixed to the driven plate so as working oil to flow therebetween.

ADVANTAGES

The torque converter having a lockup mechanism in accordance with the present invention is provided with a pressure chamber which independently functions. Therefore, the lockup mechanism is more reliably operated. As a result, the friction surfaces can be cooled by flow of the working oil. Moreover, when a multiple disc clutch is employed to increase torque transmission capacity, drag torque can be suppressed.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A torque converter having a lockup mechanism comprising:
   a front cover;
   an impeller shell attached to said front cover defining a working oil chamber having disposed therein:
   an impeller fixed to said impeller shell;
   a turbine disposed within said working oil chamber opposed to said impeller;
   a stator disposed between the radial inner portion of said impeller and the radial inner portion of said turbine;
   a lockup mechanism disposed within said working oil chamber configured for selective engagement and disengagement of said front cover with said turbine, said lockup mechanism having a piston member disposed adjacent to said front cover, said piston member and said front cover defining a sealed pressure chamber which is sealed against fluid flow between said sealed pressure chamber and a remaining portion of said working oil chamber, said piston member selectively movable to and from an engaged position and a disengaged position in response to changes in oil pressure within said sealed pressure chamber, said piston member being engaged with said front cover for rotation therewith and configured for limited axial movement with respect to said front cover;
   a first seal member disposed on a radial mid-portion of said piston member and in contact with a portion of said front cover, a second seal member in contact with a radial inner portion of said piston member for providing a seal between said pressure chamber and said remaining portion of said working oil chamber;
   a portion of said front cover comprises a cylindrical wall, and said first annular seal contacts a radial inner surface of said cylindrical wall, said lockup mechanism includes a clutch portion and said cylindrical wall is formed radially inward from a radially inner periphery of said clutch portion;
   a center boss fixed to said front cover, said center boss including a first cylindrical portion which extends toward said impeller and said turbine, wherein:
   said second seal member is disposed in an annular groove formed in said first cylindrical portion;
   said turbine comprises a turbine hub having second cylindrical portion extending axially along a radial inner side of said first cylindrical portion;
   wherein said first cylindrical portion is formed with a first port open to said pressure chamber;
   a second port which is disposed between said center boss and said turbine hub, said second port being open to said remaining portion of said working oil chamber; and
   a third annular seal disposed in said second cylindrical portion of said turbine hub between said first and second ports providing a seal therebetween.

2. The torque converter having the lockup mechanism as set forth in claim 1, wherein said piston member is formed from a disc-shaped plate of deformed sheet metal.

3. The torque converter having the lockup mechanism as set forth in claim 1, wherein said second port and said piston member are configured to allow circulation of a working oil through said clutch portion.

4. The torque converter having the lockup mechanism as set forth in claim 3, wherein said remaining portion of said working oil chamber includes a first space defined between said piston member and a portion of said turbine, said second port being configured to allow flow of said working oil into said first space, portions of said piston member being formed with holes positioned to allow generally continuous flow of said working oil through said clutch portion into a space defined between radial outer portions of said turbine and said impeller regardless of the position said piston member.

5. The torque converter having the lockup mechanism as set forth in claim 4, wherein said second port is a sole inlet for said working oil flowing into said remaining portion of said working oil chamber.

6. The torque converter having the lockup mechanism as set forth in claim 5, wherein said portions of said piston member being formed with said holes includes a generally radial mid-portion thereof formed with a set of first discharge holes adjacent to said first seal member.

7. The torque converter having the lockup mechanism as set forth in claim 6, wherein said clutch portion comprises at least one driven plate having a friction surface formed with a plurality of grooves, said grooves configured to allow said working oil to flow from a radial inner side of said driven plate to a radial outer side thereof.

8. The torque converter having the lockup mechanism as set forth in claim 7, wherein said clutch portion comprises a first drum fixed to said front cover, a second drum which is concentrically disposed radial inwardly from said first drum and coupled to said turbine, and said driven plate disposed between said first drum and said second drum, said driven plate configured to rotate with said second drum.

9. The torque converter having the lockup mechanism as set forth in claim 8, wherein said second drum is formed with a radially penetrating hole which allows said working oil to flow from said first space to a radial outer side of said second drum.

10. The torque converter having the lockup mechanism as set forth in claim 9, wherein:
    said front cover comprises a second cylindrical wall extending toward said turbine; and
    said first drum is fitted within an inner periphery of said second cylindrical wall.

11. The torque converter having the lockup mechanism as set forth in claim 10, wherein said first drum comprises an annular disc portion fixed to said front cover radially inward from said second cylindrical wall.

12. The torque converter having the lockup mechanism as set forth in claim 11, wherein:
    said first drum comprises a plurality of first teeth protruding radially inwardly;
    said second drum comprises a plurality of second teeth protruding radially outwardly; and
    said driven plate comprises on a radial inner portion thereof a plurality of third teeth engaging with said plurality of said second teeth.

13. The torque converter having the lockup mechanism as set forth in claim 12, wherein said first drum is formed with a tapering outer diameter, said tapering outer diameter increasing from adjacent to said front cover toward said turbine such that centrifugal force moves said working oil in the direction of the increase of said tapering outer diameter.

14. The torque converter having the lockup mechanism as set forth in claim 13, wherein said clutch portion includes a drive plate disposed adjacent to said driven plate, said drive plate formed with a set of fourth teeth engaged with said first teeth on said first drum, and a portion of said drive plate and said first drum define a plurality of gaps between portions thereof which allow for the flow of said working oil.

15. The torque converter having the lockup mechanism as set forth in claim 14, wherein said piston member is formed at a radially outer edge with fifth teeth which engage said first teeth of said first drum.

16. The torque converter having the lockup mechanism as set forth in claim 15, wherein said piston member comprises a pressing portion configured to contact said driven plate of said clutch portion.

17. The torque converter having the lockup mechanism as set forth in claim 16, further comprising:
a backup plate mounted in said first drum and restrained against axial movement within said first drum, said driven plate comprising a first and a second driven plates where said drive plate is axially disposed between said first and second driven plates and said first and second driven plates are disposed between said backup plate and said pressing portion of said piston member.

18. The torque converter having the lockup mechanism as set forth in claim 17, wherein said backup plate is formed on a radial inner portion thereof with a protruding portion which limits flow of said working oil around said radially inner portion of said backup plate portion.

19. The torque converter having the lockup mechanism as set forth in claim 18, wherein said radially penetrating holes of said second drum are open to a space defined between radial inner portions of said first and second driven plates.

20. The torque converter having the lockup mechanism as set forth in claim 19, further comprising a snap ring confined in said first drum adjacent to said backup plate limiting axial movement of said backup plate.

21. The torque converter having the lockup mechanism as set forth in claim 20, wherein said second drum is fixed to said turbine.

22. The torque converter having the lockup mechanism as set forth in claim 20, further comprising a damper mechanism elastically connecting said second drum to said turbine.

23. The torque converter having the lockup mechanism as set forth in claim 22, wherein said damper mechanism comprises at least one pair of coil springs.

24. A torque converter having a lockup mechanism comprising:
a front cover;
an impeller shell attached to said front cover defining a working oil chamber disposed therein:
an impeller fixed to said impeller shell;
a turbine disposed within said working oil chamber opposed to said impeller;
a stator disposed between the radial inner portion of said impeller and the radial inner portion of said turbine; and
a lockup mechanism disposed within said working oil chamber configured for selective engagement and disengagement of said front cover with said turbine, said lockup mechanism having a piston member disposed adjacent to said front cover and a plurality of clutch plates, said piston member being a disk-like plate, a portion of said piston member and a portion of said front cover defining a pressure chamber therebetween, said piston member selectively movable to and from an engaged position and a disengaged position with said clutch plates in response to changes in oil pressure within said pressure chamber, said clutch plates are disposed on the turbine side of the radially outer circumference of the piston member, wherein:
said piston member and said front cover define a first space formed radially outward of said pressure chamber, said first space being sealed from said pressure chamber, said first space being connected with said working oil chamber such that working oil flows from said first space into a second space between said piston member and said turbine, the working oil being moved by a working oil providing means which supplies working oil into said first space, and said piston member being formed with a passage between said first space and said second space.

25. The torque converter having the lock-up mechanism as set forth in claim 24, further comprising an annular seal member disposed between a radial mid-portion of said piston member and said front cover in order to seal between said pressure chamber and said first space.

26. The torque converter having the lockup mechanism as set forth in claim 25, wherein said annular seal member is disposed radially inward of said clutch plates.

27. The torque converter having the lockup mechanism as set forth in claim 25, wherein said annular seal member is attached to said piston member and is in contact with said front cover.

28. The torque converter having the lockup mechanism as set forth in claim 27, wherein a portion of said front cover comprises a cylindrical wall, and said annular seal member contacts a radial inner surface of said cylindrical wall.

29. The torque converter having the lockup mechanism as set forth in claim 28, wherein said cylindrical wall is formed radially inward from a radially inner periphery of said clutch plates.

30. The torque converter having the lockup mechanism as set forth in one of claim 24, wherein said passage is a plurality of holes adjacent to said annular seal member.

31. A torque converter having a lockup mechanism comprising:
a front cover;
an impeller shell attached to said front cover defining a working oil chamber disposed therein:
an impeller fixed to said impeller shell;
a turbine disposed within said working oil chamber opposed to said impeller;
a stator disposed between the radial inner portion of said impeller and the radial inner portion of said turbine; and
a lockup mechanism disposed within said working oil chamber configured for selective engagement and disengagement of said front cover with said turbine, said lockup mechanism having a piston member disposed adjacent to said front cover and a plurality of clutch plates, said piston member being disk-like plate, a radially inner portion of said piston member and a radial inner portion of said front cover defining a pressure chamber, said piston member selectively movable to and from an engaged position and a disengaged position with said clutch plates in response to changes in oil pressure within said pressure chamber, said clutch plates are disposed on a turbine side of a radially outer circumference of said piston member, wherein:
a radial outer portion of said piston member is formed with an annular pressure portion, said piston member is further formed with an engagement portion around said annular pressure portion for engagement with said front cover such that said piston member rotates with said front cover and can move in the axial direction relative to said front cover.

32. The torque converter having the lockup mechanism as set forth in claim 31, wherein said engagement portion is a plurality of teeth formed around the outer periphery of said piston member.

33. A torque converter having a lockup mechanism comprising:
a front cover;
an impeller shell attached to said front cover defining a working oil chamber disposed therein:
an impeller fixed to said impeller shell;
a turbine disposed within said working oil chamber opposed to said impeller;
a stator disposed between the radial inner portion of said impeller and the radial inner portion of said turbine; and
a lockup mechanism disposed within said working oil chamber configured for selective engagement and disengagement of said front cover with said turbine, said lockup mechanism having a piston member disposed adjacent to said front cover and a plurality of clutch plates, said piston member being a disk-like plate disposed adjacent to said front cover, a radially inner portion of said piston member and a radial inner portion of said front cover defining a pressure chamber, said piston member selectively movable to and from an engaged position and a disengaged position with said clutch plates in response to changes in oil pressure within said pressure chamber, said clutch plates are disposed on the turbine side of the radially outer circumference of the piston member, wherein
a working oil providing means within said torque converter is configured to supply working oil into a space defined between said piston member and said turbine; and
a portion of said torque converter is formed with a passage between said space and said working oil chamber such that working oil passes through said clutch plates for cooling said clutch plates.

34. The torque converter having the lockup mechanism as set forth in claim 33, wherein said working oil providing means supplies working oil into said space through said passage with said piston member in the engaged position or in the disengaged position.

35. The torque converter having the lockup mechanism as set forth in claim 33, wherein said passage allows working oil to flow from said space to said working oil chamber through said clutch plates in the engaged position or in the disengaged position.

36. The torque converter having the lockup mechanism as set forth in claim 35, wherein said clutch plates are composed of a drive plate engaged with said front cover and a driven plate, said torque converter further comprising a drum disposed radially inside of said driven plate, engaged with said driven plate and connected with said turbine.

37. The torque converter having the lockup mechanism as set forth in claim 36, wherein said drum is formed with a radially penetrating hole which at least partially defines said passage.

38. The torque converter having the lockup mechanism as set forth in claim 36, wherein one of said drive plate and driven plate is formed with a radially penetrating groove on the surface which at least partially defines said passage.

39. The torque converter having the lockup mechanism as set forth in claim 36, wherein front cover is provided with a plurality of first teeth extending in the axial direction and disposed in the circumferential direction, said drive plate is formed with a plurality of second teeth around the outer periphery for engagement with said first teeth, and said first teeth and said second teeth are engaged such that a space is formed therebetween through which working oil can move in the axial direction at least partially defining said passage.

40. The torque converter having the lockup mechanism as set forth in claim 39, wherein said first teeth have tapering inner diameter, said tapering inner diameter increasing from adjacent to said front cover toward said turbine such that centrifugal force moves said working oil in the direction of the increase of said tapering inner diameter.

41. A torque converter having a lockup mechanism comprising:
a front cover;
an impeller shell attached to said front cover defining a working oil chamber disposed therein:
an impeller fixed to said impeller shell;
a turbine disposed within said working oil chamber opposed to said impeller;
a stator disposed between the radial inner portion of said impeller and the radial inner portion of said turbine; and
a lockup mechanism disposed within said working oil chamber configured for selective engagement and disengagement of said front cover with said turbine, said lockup mechanism having a piston member disposed adjacent to said front cover and a plurality of clutch plates, said piston member being a disk-like plate disposed adjacent to said front cover, an inner radial portion of said piston member and an inner radial portion of said front cover defining a pressure chamber, said piston member selectively movable to and from an engaged position and a disengaged position with said clutch plates in response to changes in oil pressure within said pressure chamber, said clutch plates are disposed on the turbine side of the radially outer circumference of the piston member, characterized in that:
a radial outer portion of said front cover is formed with a cylindrical wall,
a drum is fitted within an inner periphery of said cylindrical wall, and said clutch plates include a drive plate engaged with said drum and a driven plate configured for transmitting torque to said turbine.

42. The torque converter having the lockup mechanism as set forth in claim 41, wherein said drum comprises an annular disc portion fixed to said front cover radially inward from said cylindrical wall.

43. The torque converter having the lockup mechanism as set forth in claim 41, wherein said drum comprises a plurality of teeth protruding radially inwardly for engagement with said drive plate.

44. The torque converter having the lockup mechanism as set forth in claim 41, wherein said drum has a tapering inner diameter, said tapering inner diameter increasing from adjacent to said front cover toward said turbine such that centrifugal force moves said working oil in the direction of the increase of said tapering outer diameter.

45. A torque converter having a lockup mechanism comprising:
a front cover;
an impeller shell attached to said front cover defining a working oil chamber disposed therein;
an impeller fixed to said impeller shell;
a turbine disposed within said working oil chamber opposed to said impeller;

a stator disposed between the radial inner portion of said impeller and the radial inner portion of said turbine; and a lockup mechanism disposed within said working oil chamber configured for selective engagement and disengagement of said front cover with said turbine, said lockup mechanism having a piston member disposed adjacent to said front cover and a plurality of clutch plates, said piston member being a disk-like plate, a radially inner portion of said piston member and a radial inner portion of said front cover defining a pressure chamber, said piston member selectively movable to and from an engaged position and a disengaged position with said clutch plates in response to changes in oil pressure within said pressure chamber, said clutch plates are disposed on the turbine side of the radially outer circumference of the piston member, wherein said clutch plates includes a drive plate and a driven plate; and a support plate which is disposed on a transmission side of said clutch plates, said support plate for supporting the load from said piston is adapted to be coupled to said front cover such that said support plate can neither rotate nor move axially relative to said front cover.

46. The torque converter according to claim 45, wherein said front cover is formed with a cylindrical wall, and the torque converter further comprising a drum fixed into said cylindrical wall, and said support plate is engaged with the radially inner surface of said drum such that said support plate can neither rotate or move axially relative to said front cover.

47. The torque converter according to claim 46, wherein said drum is formed with a stopper surface on the inner surface thereof for abutting against an engine-side surface of support plate, and said torque converter further comprising an engaging member fixed to the radially inner surface of said drum for abutting against a transmission-side surface of said support plate.

48. The torque converter according to claim 47, wherein said drum is formed with a plurality of teeth extending axially and arranged circumferentially on the inner surface thereof, said teeth are formed in two groups, an engine side group and a transmission side group, said engine side group having an inner diameter that is smaller than that of said transmission side group of said teeth such that said engine side group of said teeth define said stopper surface, and said support plate is formed with a plurality of protrusions on the outer periphery for engagement with said transmission side group of said teeth.

49. The torque converter according to claim 48, wherein said clutch plates further includes a middle plate disposed between said piston and said support plate, said middle plate being engaged with said engine side group of said teeth such that said middle plate can move axially but cannot rotate relative to said drum, and said clutch plates further includes a first driven plate between said piston and said middle plate, and a second driven plate between said middle plate and said support plate.

* * * * *